(12) United States Patent
Walldeen et al.

(10) Patent No.: US 12,096,244 B2
(45) Date of Patent: Sep. 17, 2024

(54) AUTOMATIC CENTRAL UNIT USER PLANE CREATION

(71) Applicant: Telefonaktiebolaget LM Ericsson (publ), Stockholm (SE)

(72) Inventors: Thomas Walldeen, Linköping (SE); Stefan Eng, Linköping (SE); Torbjörn Örtengren, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 558 days.

(21) Appl. No.: 17/425,930

(22) PCT Filed: Feb. 13, 2020

(86) PCT No.: PCT/EP2020/053821
§ 371 (c)(1),
(2) Date: Jul. 26, 2021

(87) PCT Pub. No.: WO2020/165377
PCT Pub. Date: Aug. 20, 2020

(65) Prior Publication Data
US 2022/0116794 A1  Apr. 14, 2022

Related U.S. Application Data

(60) Provisional application No. 62/806,257, filed on Feb. 15, 2019.

(51) Int. Cl.
*H04W 76/20* (2018.01)
*H04W 24/02* (2009.01)
(Continued)

(52) U.S. Cl.
CPC ........... *H04W 24/02* (2013.01); *H04W 76/10* (2018.02); *H04W 76/20* (2018.02); *H04W 84/042* (2013.01)

(58) Field of Classification Search
CPC ... H04W 24/02; H04W 76/20; H04W 84/042; H04W 76/10
See application file for complete search history.

(56) References Cited

U.S. PATENT DOCUMENTS

2018/0368109 A1* 12/2018 Kim ................ H04W 72/04
2020/0045583 A1*  2/2020 Kim ................ H04W 28/0815
(Continued)

OTHER PUBLICATIONS

Huawei, "(TP for NR BL CR for TS 38.463) on PLMN over E1C non-UE associated signaling," 3GPP TSG-RAN WG3 #101, Gothenburg, Sweden, Aug. 20-24, 2018, R3-185092, 16 pages.
(Continued)

*Primary Examiner* — Hassan A Phillips
*Assistant Examiner* — Prenell P Jones
(74) *Attorney, Agent, or Firm* — Weisberg I.P. Law, P.A.

(57) ABSTRACT

The invention relates to a method performed by a network function capable of supporting at least a user plane, UP, functional part of a base station (440B), comprises establishing a transport network layer, TNL, association with a control plane, CP, functional part of the base station; receiving a request message (501) from the CP functional part of the base station (415), wherein the request message comprises an identifier of the base station; creating a UP functional part of the base station using the identifier of the base station; and transmitting a response message (505) to the CP functional part of the base station, wherein the response message comprises an identifier of the created UP functional part of the base station; the invention further relates to a method performed by a CP functional part of a base station; and to corresponding network node adapted to perform above-described methods.

28 Claims, 9 Drawing Sheets

(51) Int. Cl.
    *H04W 76/10*        (2018.01)
    *H04W 84/04*        (2009.01)

(56)            References Cited

U.S. PATENT DOCUMENTS

| | | | |
|---|---|---|---|
| 2020/0053545 A1* | 2/2020 | Wong | H04W 8/08 |
| 2020/0120724 A1* | 4/2020 | Vaidya | H04W 76/27 |
| 2021/0185755 A1* | 6/2021 | Kim | H04W 68/005 |
| 2021/0219374 A1* | 7/2021 | Huang | H04W 76/11 |
| 2021/0385720 A1* | 12/2021 | Svennebring | H04W 40/18 |
| 2022/0116821 A1* | 4/2022 | Wei | H04L 27/2636 |

OTHER PUBLICATIONS

International Search Report in PCT/EP2020/053821 dated Apr. 20, 2020, 3 pages.

\* cited by examiner

AUTOMATIC CENTRAL UNIT USER PLANE CREATION

CROSS REFERENCE TO RELATED APPLICATION(S)

This application is a 35 U.S.C. § 371 National Stage of International Patent Application No. PCT/EP2020/053821, filed Feb. 13, 2020, claiming benefit from provisional U.S. Patent Application No. 62/806,257, filed Feb. 15, 2019, designating the United States.

TECHNICAL FIELD

This disclosure generally relates to a disaggregated base station, and more specifically relates to automatic creation of a central unit user plane functional part of a disaggregated base station.

BACKGROUND

3GPP is currently standardizing the 5G Core Network as part of the overall 5G System architecture. FIG. 1 illustrates a 5G network architecture. The 5G network architecture shown in FIG. 1 comprises a plurality of user equipment (UEs) 110a-g (i.e., any device capable of wirelessly communicating with an access network, including smartphones, smart appliances, sensors, and other Internet-of-Things (IoT) devices) connected to a base station 105a, e.g. such as evolved Node Bs (eNBs) or 5G base stations (gNBs) or similar.

The current 3GPP specification specifies an architecture where a gNodeB 105a within an NG RAN comprises a Central Unit (gNB-CU) and one or more Distributed Units (gNB-DUs). The CU can in its turn be divided into a CU Control Plane (gNB-CU-CP) part 115 and one or more CU User Plane parts (gNB-CU-UPs) 120a-n. In many respects, the 5G core network aims at separating user plane (UP) and control plane (CP). Separating the user and control planes helps each plane resource to be scaled independently. It also allows user plane functions to be deployed separately from control plane functions in a distributed fashion. In this architecture, UPFs may be deployed very close to UEs to shorten the Round Trip Time (RTT) between UEs and data network for some applications requiring low latency.

3GPP also defines the O&M view of this system, where each of the logical nodes gNB-CU-CP 115, gNB-CU-UP 120a-n, and gNB-DU can be configured by a corresponding managed function, namely GNBCUCPFunction, GNBCUUPFunction and GNBDUFunction, respectively.

The current 3GPP specification implies that all managed functions must be created, and at least to a certain extent, be configured manually. This may be tedious work for an operator, and in most cases, the gNB-CU-UP does not have any gNodeB specific data. Current 3GPP TS 28.541 requires the gNodeB identity and gNodeB Identity length as mandatory attributes for the GNBCUUPFunction.

SUMMARY

It is a task of the present invention to perform automatic creation of a user plane functional part, (e.g. a central plane user plane functional part, GNBCUUPFunction) of a base station (gNB).

According to an embodiment, a method performed by a network function capable of supporting at least a user plane, UP, functional part of a base station, comprises establishing a transport network layer, TNL, association with a control plane, CP, functional part of the base station; receiving a request message from the CP functional part of the base station, wherein the request message comprises an identifier of the base station; creating a UP functional part of the base station using the identifier of the base station; and transmitting a response message to the CP functional part of the base station, wherein the response message comprises an identifier of the created UP functional part of the base station.

According to an embodiment, a method performed by a control plane, CP, functional part of a base station comprises establishing a transport network layer, TNL, association with a network function capable of supporting at least a user plane, UP, functional part of the base station; transmitting to the network function a request message comprising an identifier of the base station; and receiving a response message from the network function, the response message comprising an identifier of a UP functional part of the base station, wherein the UP functional part of the base station was created by the network function using the identifier of the base station.

According to an embodiment, a network node (gNB) is provided, wherein network node is adapted to establishing a transport network layer, TNL, association with a control plane, CP, functional part of the base station; receiving a request message from the CP functional part of the base station, wherein the request message comprises an identifier of the base station; creating a UP functional part of the base station using the identifier of the base station; and transmitting a response message to the CP functional part of the base station, wherein the response message comprises an identifier of the created UP functional part of the base station.

According to an embodiment, a network node (gNB) is provided, wherein network node is adapted to establishing a transport network layer, TNL, association with a network function capable of supporting at least a user plane, UP, functional part of the base station; transmitting to the network function a request message comprising an identifier of the base station; and receiving a response message from the network function, the response message comprising an identifier of a UP functional part of the base station, wherein the UP functional part of the base station was created by the network function using the identifier of the base station.

According to some embodiments, when establishing the E1 interface, the gNB-CU-CP may provide the needed gNodeB specific data (and other needed data) already available in the gNB-CU-CP to a Virtual Network Function (VNF) capable of realizing one or more gNB-CU-UP. The related GNBCUUPFunction can then be created automatically with the received data without any operator or orchestration interaction.

BRIEF DESCRIPTION OF THE DRAWINGS

The accompanying drawings, which are incorporated herein and form part of the specification, illustrate various embodiments.

DETAILED DESCRIPTION

Figure 1:
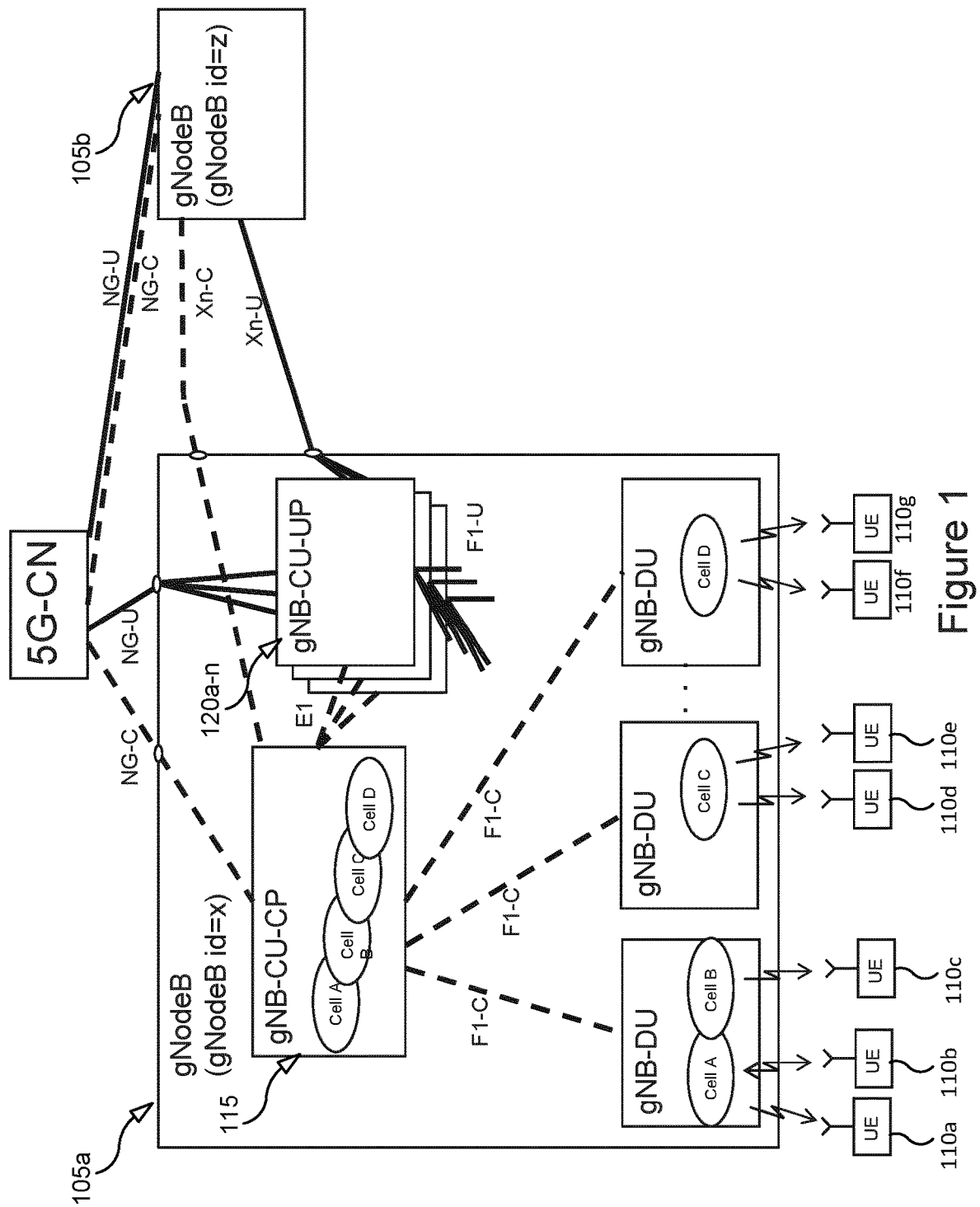
FIG. 1 illustrates a network architecture according to some embodiments.

The embodiments disclosed herein enable automatic creation of the GNBCUUPFunction in the orchestration and management (O&M) view without any operator or other system need to create and configure it. One advantage of automatic creation is that it removes the possibility of many configuration problems caused by inconsistencies. Furthermore, a gNB-CU-UP can be created and used in a network element even if there are O&M communication (or O&M management system) problems for the network element.

According to preferred embodiments, the necessary gNodeB specific data (and other needed data) that is already available in the gNB-CU-CP may be provided to the gNB-CU-UP when establishing the E1 interface. The establishment of the E1 interface is done via the application protocol E1AP using the message GNB-CU-CP E1 Setup Request.

By way of background, as described in 3GPP TS 28.541, the gNB-CU-CP function may be configured with the following attributes shown in Table 1.

TABLE 1

| Attribute name | Support Qualifier | isReadable | isWritable | isInvariant | isNotifyable |
|---|---|---|---|---|---|
| gNBId | M | T | T | F | T |
| gNBIdLength | M | T | T | F | T |
| gNBCUName | O | T | T | F | T |
| pLMNIdList | M | T | T | F | T |

Additionally, as described in 3GPP TS 28.541, the gNB-CU-UP function may comprise the following attributes shown in Table 2.

TABLE 2

| Attribute name | Support Qualifier | isReadable | isWritable | isInvariant | isNotifyable |
|---|---|---|---|---|---|
| pLMNIdList | M | T | T | F | T |
| gNBId | M | T | T | F | T |
| gNBIdLength | M | T | T | F | T |

Moreover, 3GPP TS 38.463 E1AP, which is incorporated herein by reference in its entirety, describes a gNB-CU-CP E1 setup procedure designed to exchange application level data needed for the gNB-CU-CP and the gNB-CU-UP to correctly interoperate on the E1 interface. The gNB-CU-CP initiates the procedure by sending a GNB-CU-CP E1 SETUP REQUEST message including the appropriate data to the gNB-CU-UP. The gNB-CU-UP responds with a GNB-CU-CP E1 SETUP RESPONSE message including the appropriate data. According to the current specification, TS 38.463, section 9.2.1.7, the GNB-CU-CP E1 SETUP REQUEST message may include the message code, transaction id and CUCP Name shown in Table 3.

TABLE 3

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.53 | | YES | reject |
| gNB-CU-CP Name | O | | PrintableString(SIZE(1 . . . 150, . . .)) | Human readable name of the gNB-CU-CP. | YES | ignore |

In order to be able to create the corresponding GNBCUUPFunction object, the GNB-CU-CP E1 SETUP REQUEST message may be extended to further include the gNodeB identity and gNodeB Identity length, which are already configured in the GNB-CU-CP. In some embodiments, the GNB-CU-CP E1 SETUP REQUEST message may be further extended to include which PLMNs and slices the GNB-CU-UP function shall support, which are also already configured in the GNB-CU-CP. The PLMNs information is presently mandatory in the response message GNB-CU-CP E1 Setup Response. In other embodiments, the PLMN lists and slices can instead use a default or common configuration for all gNB-CU-UPs realized on a VNF.

Figure 2:
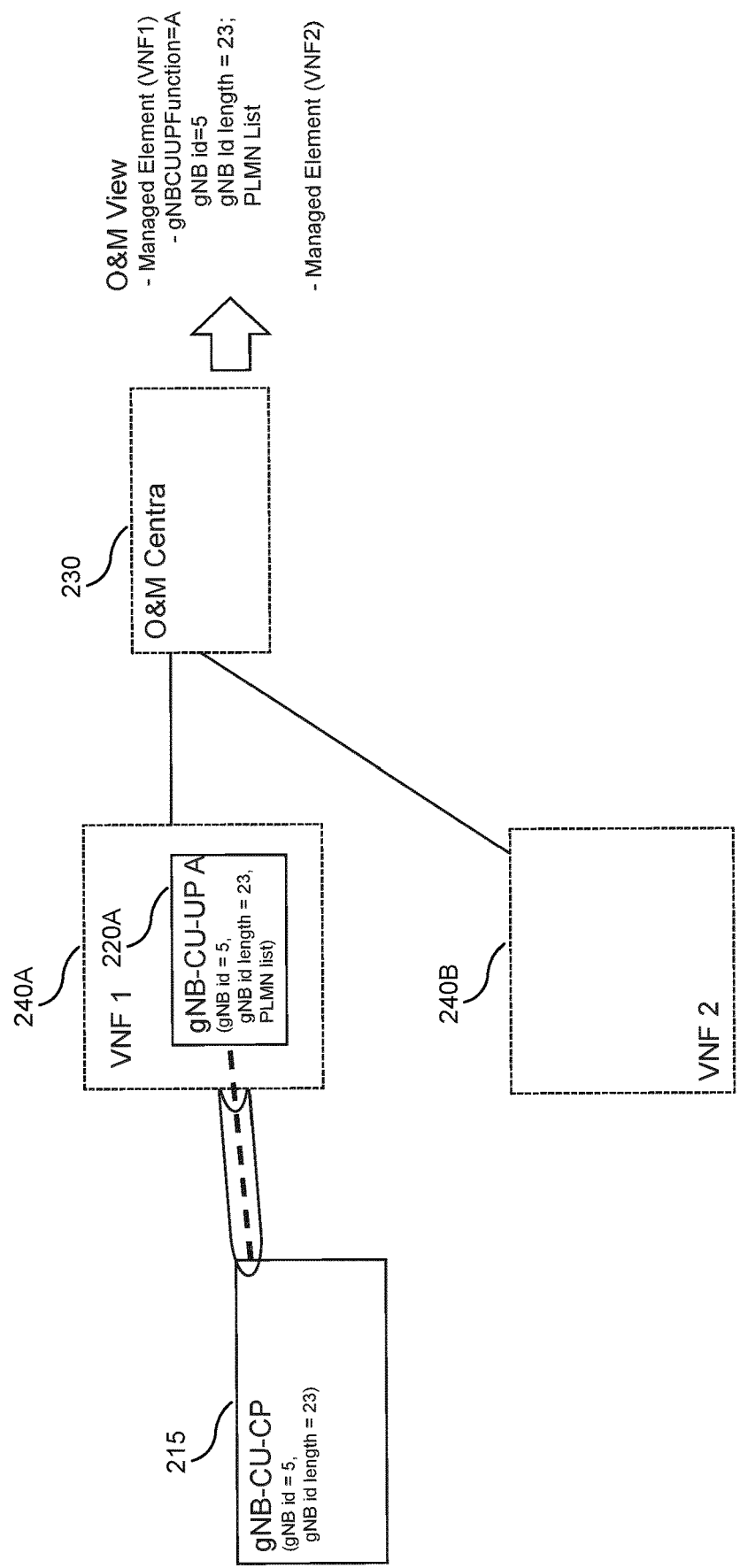
FIG. 2 illustrates a communication system and flow according to some embodiments.

FIG. 2 illustrates a communication system and flow according to some embodiments. A certain gNodeB is made up via one gNB-CU-CP, one gNB-CU-UP, and a number of gNB-DUs (gNB-DUs are not shown in FIG. 2). FIG. 2 depicts a communication system with a gNB-CU-CP logical node 215 and a gNB-CU-UP A 220A logical node realized in the cloud by a certain type of VNF (VNF1) 240A. The cloud may further contain another VNF (VNF2) 240B, as well as a O&M Centra 230 with a O&M view of its managed elements (e.g. VNF1 and VNF2), each with one or more functions (e.g., gNBCUUPFunction) and their respective attributes (e.g., gNB=5, gNB id length=23, PLMN List). Each VNF can support one or more gNB-CU-UPs and/or gNB-CU-CPs. As shown in FIG. 2, the gNB-CU-UP A 220A is realized by the VNF 1 240A, and is coupled with gNB-CU-CP 215 for a specific gNB (gNB id=5, gNB Id length=23).

Figure 3:
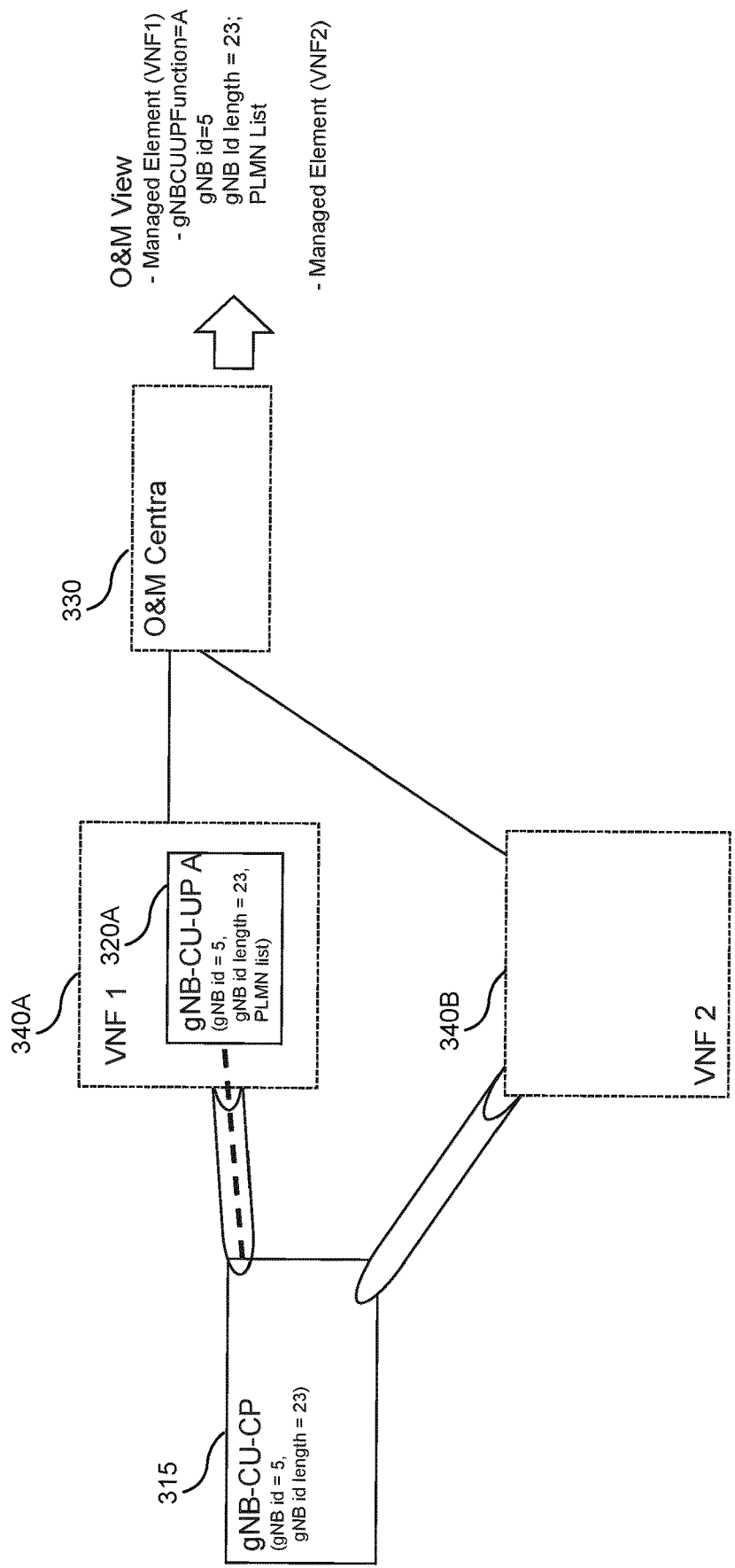
FIG. 3 illustrates a communication system and flow according to some embodiments.

FIG. 3 illustrates a communication system and flow according to some embodiments. FIG. 3 shares the same architecture as FIG. 2, described above. As shown in FIG. 3, the gNB-CU-CP 315 needs one more gNB-CU-UP logical node (hence for the same gNB), and knows IP addresses of a number of VNFs 340A, 340B that contains the gNB-CU-UPs. The gNB-CU-CP 315 initiates setup of signaling transport towards a selected VNF (VNF2) 340B, which may support automated creation of one or more gNB-CU-UPs.

SCTP is the signaling transport layer mandated to be used between realization nodes realizing gNB-CU-CP and gNB-CU-UP.

Figure 4:
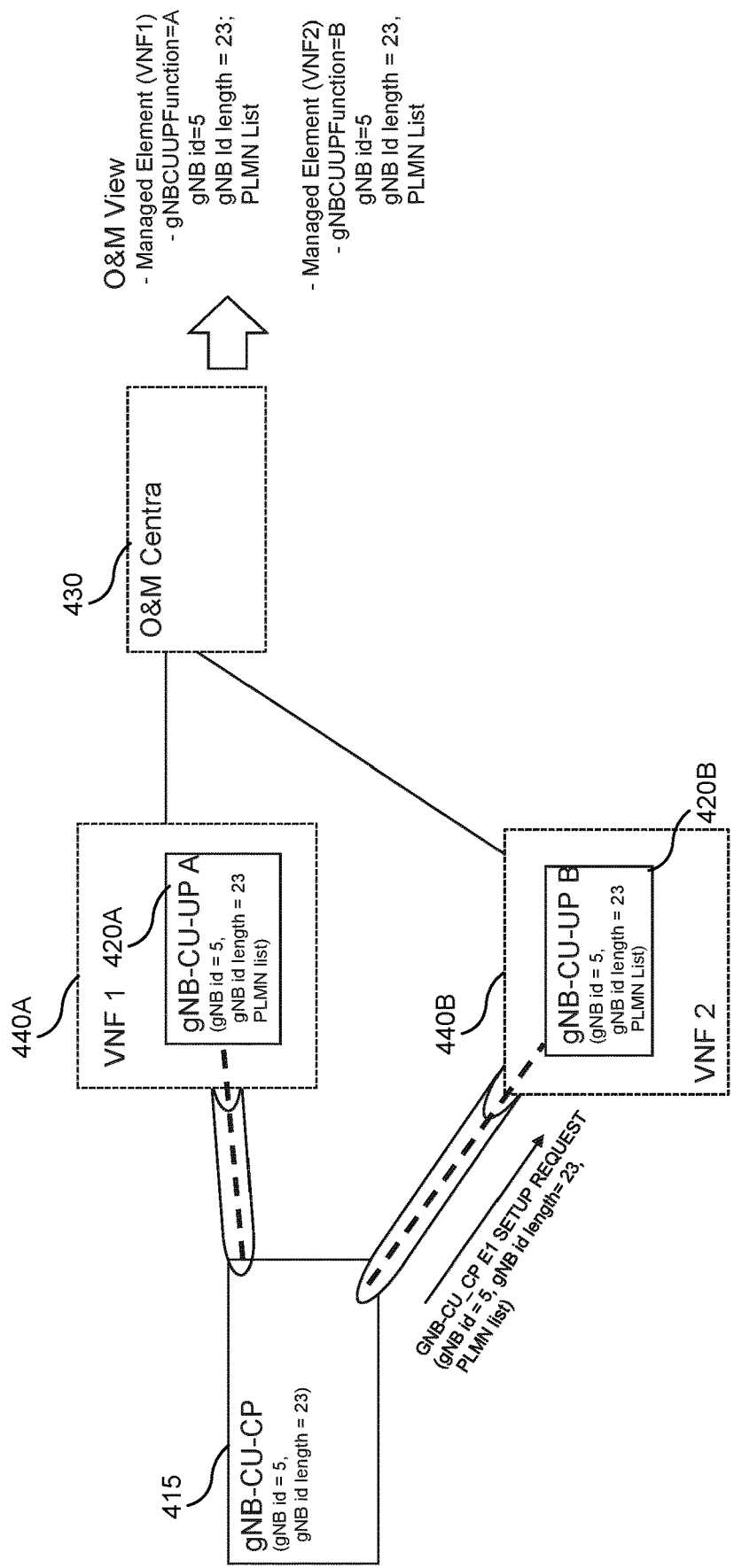
FIG. 4 illustrates a communication system and flow according to some embodiments.

FIG. 4 illustrates a communication system and flow according to some embodiments. FIG. 4 shares the same architecture as FIGS. 2-3, described above. As shown in FIG. 4, the gNB-CU-CP 415 initiates automated creation of a gNB-CU-UP 420B (gNB-CU-UP B) in VNF 2 440B using a new signaling transport by setting up the E1 interface towards VNF2 440B using the E1AP messages GNB-CU-CP E1 SETUP REQUEST. As shown in FIG. 4, this message is now extended with information needed to create the gNB-CU-UP B 420B automatically. The information may include gNB identity and gNB identity length. In some embodiments, the information may further include a PLMN list indicating valid PLMNs and slices.

The VNF2 440B can in turn use the received information to automatically create a new gNB-CU-UP B 420B and its corresponding O&M object GNBCUUPFunction. For example, the VNF2 440B may use the received gNB identity and gNB identity length as attributes for a new GNB-CU-UP 420B. For the currently required PLMN List attribute, the VNF2 440B may use PLMN List information, if any, transmitted in the GNB-CU-CP E1 SETUP REQUEST or use a default or pre-configured value in VNF2 440B. The VNF2 440B may in turn respond back to the GNB-CU-CP 415 with the E1AP GNB-CU-CP E1 SETUP RESPONSE message identifying the automatically created gNB-CU-UP B 440B.

Figure 5:
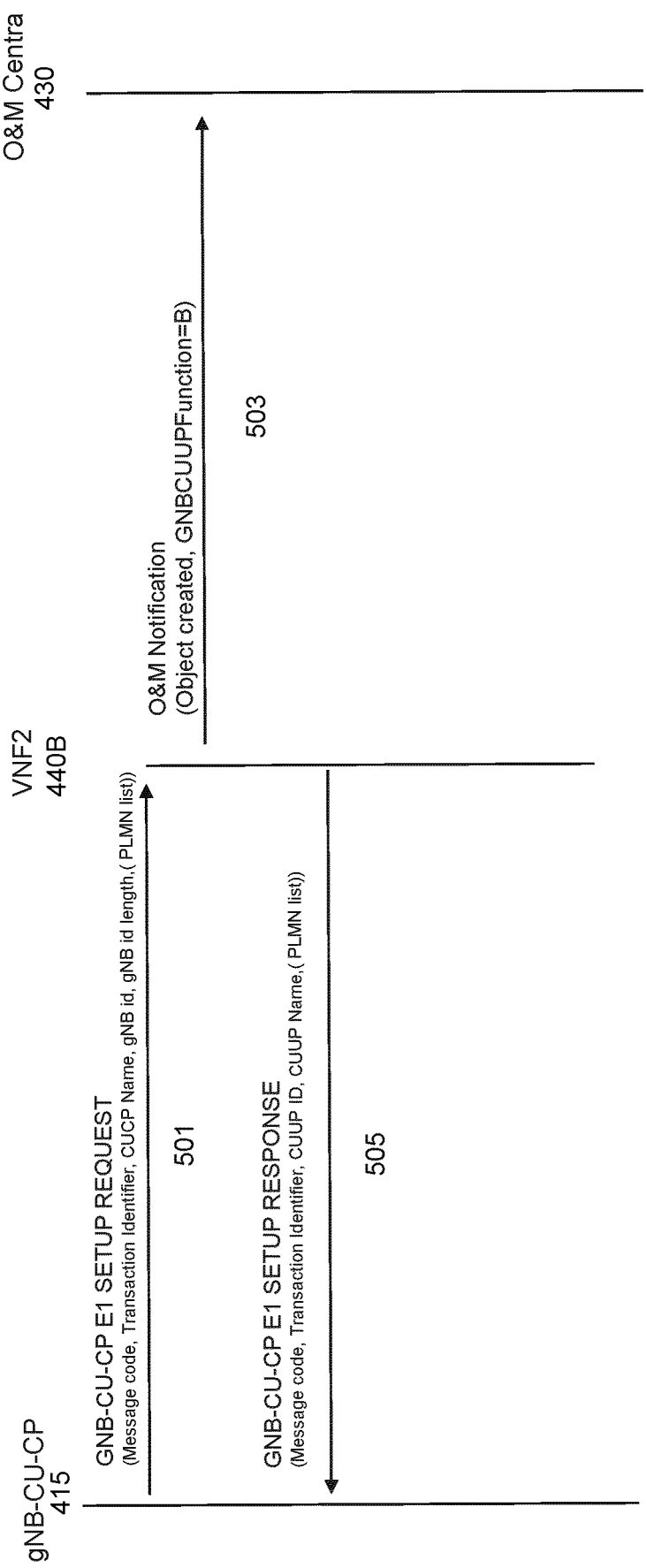
FIG. 5 illustrates a message flow according to some embodiments.

FIG. 5 illustrates a message flow according to some embodiments. The gNB-CU-CP 415 and VNF2 440B depicted in FIG. 5 correspond to the gNB-CU-CP 415 and VNF2 44-B depicted in FIG. 4. As shown in FIG. 5, a gNB-CU-CP 415 transmits a GNB-CU-CP E1 SETUP REQUEST message 501 towards a VNF2 440B. The SETUP REQUEST message 501 may comprise the message code, transaction identifier, and gNB-CU-CP Name as specified in TS 38.463. According to some embodiments, the SETUP REQUEST message 501 is extended to include gNB identity and gNB length. According to other embodiments, the SETUP REQUEST message 501 is further extended to include a PLMN list attribute also possibly including the related allowed slice identifiers to the PLMNs. As described above in connection with FIG. 4, the VNF2 440B may use the gNB identity and gNB length in order to automatically create a new gNB-CU-UP 420B configured with such information.

In creating the new gNB-CU-UP (e.g., gNB-CU-UP B) 420B, the VNF2 440B may send an O&M notification 503 to an O&M Centra node 430. The notification may include attributes Object created, and the automatically created GNBCUUPFunction=B. The O&M Centra node may then add the automatically created GNBCUUPFunction=B to its O&M view.

After creating the new gNB-CU-UP (e.g., gNB-CU-UP B), the VNF2 440B may send a GNB-CU-CP E1 SETUP RESPONSE 505 towards the gNB-CU-CP 415. The SETUP RESPONSE message 415 may comprise the message code, transaction identifier, gNB-CU-UP identifier of the newly created gNB-CU-UP, gNB-CU-UP Name, and PLMN list attributes.

Figure 6:
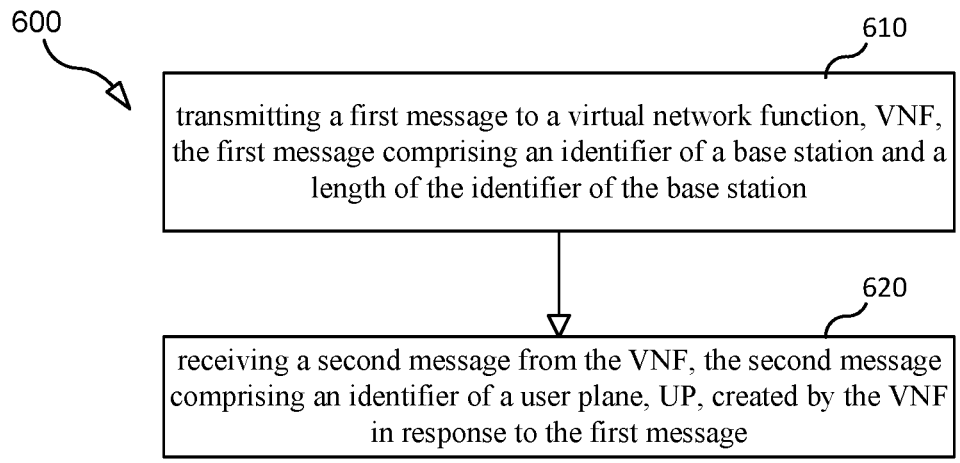
FIG. 6 illustrates a process according to some embodiments.

FIG. 6 illustrates a process 600 according to some embodiments. Process 600 may be a method performed by a gNB-CU-CP and/or a VNF realizing a gNB-CU-CP, such as gNB-CU-CP realized in the communications network depicted in FIG. 4. The method includes transmitting a first message to a virtual network function (e.g., VNF2), the first message comprising an identifier of a base station (e.g., eNB id) and a length of the identifier of the base station (e.g., eNB id length) (step 610). In some embodiments, the first message further comprises a PLMN list attribute and also possibly the related allowed slice identifiers to the PLMNs. The method further includes the step of receiving a second message from the VNF, the second message comprising an identifier of a user plane (e.g., gNB-CU-UP B) created by the VNF (e.g, VNF2) in response to the first message (step 620). In some embodiments, the first message may be the SETUP REQUEST message as described above in connection with FIG. 5.

Figure 7:
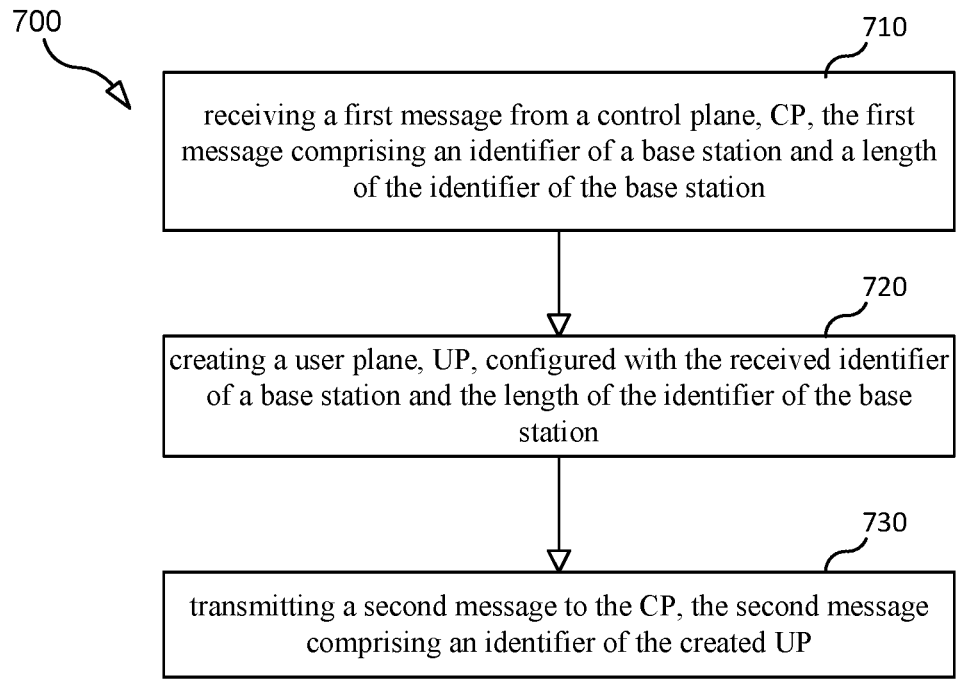
FIG. 7 illustrates a process according to some embodiments.

FIG. 7 illustrates a process 700 according to some embodiments. Process 700 may be a method performed by a VNF capable of supporting one or more gNB-CU-UPs, such as VNF2 realized in the communications network depicted in FIG. 4. The method includes receiving a first message from a control plane, the first message comprising an identifier of a base station (e.g., eNB id) and a length of the identifier of the base station (e.g., eNB id length) (step 710). The method further includes the step of creating a user plane (e.g., eNB-CU-UP B) configured with the received identifier of a base station and the length of the identifier of the base station. In some embodiments, the first message further comprises a PLMN list attribute and also possibly the related allowed slice identifiers to the PLMNs. In embodiments where the first message comprises a PLMN list attribute, and potentially the allowed slice identifiers to the PLMNs, the user plane is further configured according to the PLMN list attribute and the allowed slice identifiers. The method further includes the step of transmitting a second message to the CP, the second message comprising an identifier of the created UP (e.g., eNB-CU-UP B) (step 620). In some embodiments, the first message may be the SETUP REQUEST message as described above in connection with FIG. 5.

Figure 8:
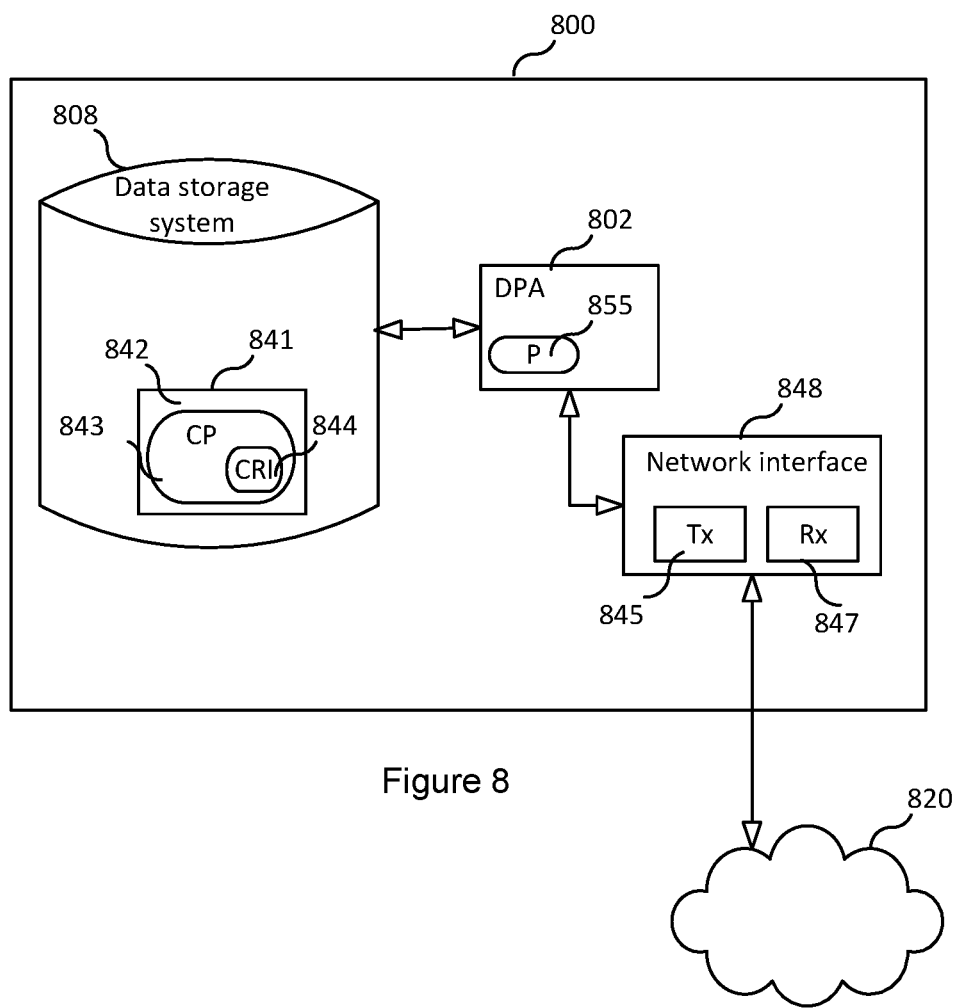
FIG. 8 is a block diagram of a node according to some embodiments.
Figure 9:
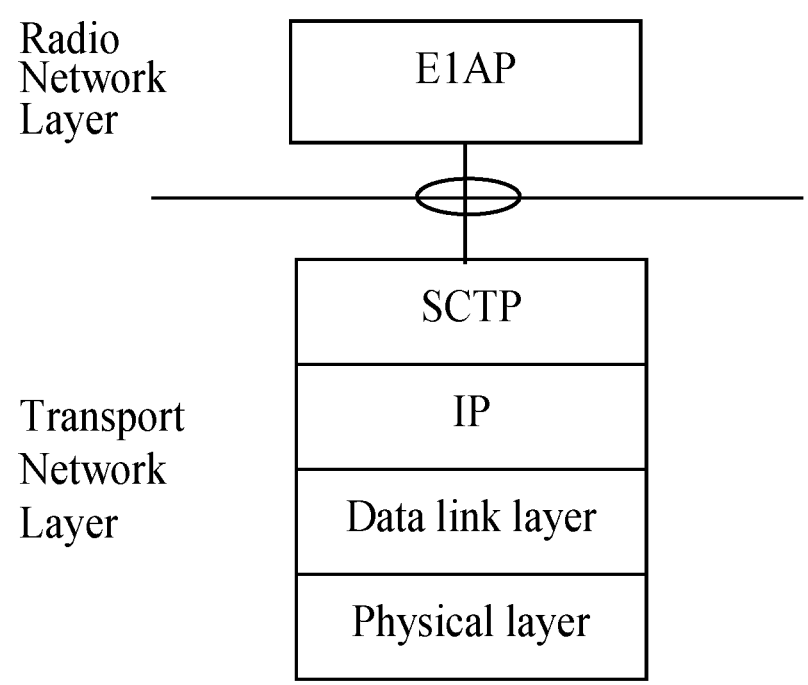
FIG. 9 is a block diagram of a signalling bearer protocol stack in a communication system, according to some embodiments.

FIG. 8 is a block diagram of a node 800 (e.g., a VNF, an eNB-CU-CP, and/or a eNB-CU-UP), according to some embodiments. As shown in FIG. 8, the node may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like); a network interface 848 comprising a transmitter (Tx) 845 and a receiver (Rx) 847 for enabling the node to transmit data to and receive data from other nodes connected to a network 820 (e.g., an Internet Protocol (IP) network, a cloud) to which network interface 848 is connected; and a local storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes the node to perform steps described herein (e.g., steps described herein with reference to the flow charts). In other embodiments, the node may be configured to perform steps described herein without the need for code. That is, for example, PC 802 may consist merely of one or more ASICs. Hence, the features of the embodiments described herein may be implemented in hardware and/or software.

DESCRIPTION OF VARIOUS EMBODIMENTS

A1. A method performed by a control plane, CP, the method comprising: transmitting a first message to a virtual network function, VNF, the first message comprising an identifier of a base station (gNB id) and a length of the identifier of the base station (eNB id length); and receiving a second message from the VNF, the second message comprising an identifier of a user plane, UP, created by the VNF in response to the first message.

A2. The method of embodiment A1, wherein the first message further comprises a list of valid Public Land Mobile Network, PLMN.

A3. The method of embodiment A1, wherein the first message further comprises a list of valid network slices.

B1. A method performed by a virtual network function, VNF, the method comprising: receiving a first message from a control plane, CP, the first message comprising an identifier of a base station (gNB id) and a length of the identifier of the base station (eNB id length); creating a user plane, UP, configured with the received identifier of a base station and the length of the identifier of the base station; and transmitting a second message to the CP, the second message comprising an identifier of the created UP.

B2. The method of embodiment B2, further comprising: generating a third message comprising an indication of the created UP; and transmitting the third message to a management function.

B3. The method of embodiment B1, wherein the first message further comprises a list of valid Public Land Mobile Network, PLMN.

B4. The method of embodiment B1, wherein the first message further comprises a list of valid network slices.

The following comprised the appendix filed with the provisional.

APPENDIX

1. Introduction

In this contribution, we propose to add the Global gNB-ID in E1 Setup from gNB-CU-CP to gNB-CU-UP in order to solve the authorization and RAN sharing issues.

2. Discussion

In order to setup E1 interface between gNB-CU-CP and gNB-CU-UP, 2 procedures are defined in TS 38.463. The first one is initiated by the gNB-CU-UP and the second one by the gNB-CU-CP. This contribution is focusing on the latter case.

In order to establish an E1 interface instance between a gNB-CU-CP and a gNB-CU-UP, the gNB-CU-CP needs to establish an SCTP/IP connection first (i.e. SCTP association).

The IP address of the gNB-CU-UP may be e.g. configured by OAM or obtained by DNS Service Discovery. The SCTP destination port is set to 38462 according to TS 38.462.

After establishing this first TNL association, the first message of the procedure (i.e. GNB-CU-CP E1 SETUP REQUEST) is sent with the following parameters shown in Table 4.

TABLE 4

| IE/Group Name | Presence | Range | IE type and reference | Semantics description | Criticality | Assigned Criticality |
|---|---|---|---|---|---|---|
| GNB-CU-CP E1 SETUP REQUEST parameters | | | | | | |
| Message Type | M | | 9.3.1.1 | | YES | reject |
| Transaction ID | M | | 9.3.1.53 | | YES | reject |
| gNB-CU-CP Name | O | | PrintableString(SIZE(1 . . . 150, . . . )) | Human readable name of the gNB-CU-CP. | YES | ignore |

At E1AP level, it can be seen that the only the gNB-CU-CP Name IE may (as it is optional) be used by the gNB-CU-UP to uniquely identify the gNB-CU-CP.

Observation 1: At E1AP level, only the gNB-CU-CP Name IE may be used by the gNB-CU-UP to uniquely identify the gNB-CU-CP However, for e.g. RAN sharing, this IE may be the same for all the gNB-IDs supported by the gNB-CU-CP.

Another issue is related to authorization. When receiving the first E1AP message, from an unknown IP address, the gNB-CU-UP does not know if it has the authorization to be connected to this gNB-CU-CP. It means that the operator will need to configure the gNB-CU-UP with the IP addresses of all the gNB-CU-CP which it can be connected to via E1 interface.

Observation 2: gNB-CU-UP needs to be configured with all the gNB-CU-CP's IP addresses which it can be connected to via E1 interface Furthermore, looking at TS 28.451, it can be seen that the following parameters shown in table 5 are required to configure a gNB-CU-UP function in case of virtualized architecture.

TABLE 5

| Attribute name | Support Qualifier | isReadable | isWritable | isInvariant | isNotifyable |
|---|---|---|---|---|---|
| pLMNIdList | M | T | T | F | T |
| gNBId | M | T | T | F | T |
| gNBIdLength | M | T | T | F | T |

In order to deploy the gNB-CU-UP function, the gNB-ID needs to be configured first. But this parameter is managed by the gNB-CU-CP. Therefore having it signalled over E1 would remove the burden of configuration by the operator.

Observation 3: In a virtualized architecture, the gNB-ID needs to be configured when deploying a gNB-CU-UP instance Therefore, adding the gNB-ID in GNB-CU-CP E1 SETUP REQUEST would solve all these issues. It will allow the gNB-CU-UP to uniquely identify the gNB-CU-CP. It is easier to configure than an IP address (e.g. range partitioning, IP addresses can be more dynamic, IP addresses are managed by the transport network, etc. . . . ). And it would remove the need for the operator to configure it in case of gNB-CU-UP virtualized function deployment.

Proposal: Add Global gNB-ID in GNB-CU-CP E1 SETUP REQUEST message

CONCLUSION

In this contribution, we propose to add the Global gNB-ID in E1 Setup from gNB-CU-CP to gNB-CU-UP in order to solve the authorization and RAN sharing issues. The following observations and proposals have been discussed.

Observation 1: At E1 AP level, only the gNB-CU-CP Name IE may be used by the gNB-CU-UP to uniquely identify the gNB-CU-CP Observation 2: gNB-CU-UP needs to be configured with all the gNB-CU-CP's IP addresses which it can be connected to via E1 interface Observation 3: In a virtualized architecture, the gNB-ID needs to be configured when deploying a gNB-CU-UP instance Proposal: Add Global gNB-ID in GNB-CU-CP E1 SETUP REQUEST message

The invention claimed is:

1. A method performed by a network function capable of supporting at least a central unit, CU, -user plane (UP) functional part of a base station, the method comprising:
    establishing a transport network layer (TNL) association with a CU-control plane (CP) functional part of the base station;
    receiving a request message for establishing an E1 interface from the CU-CP functional part of the base station, the request message including an identifier of the base station, the identifier including a gNB identity of the base station;
    creating a CU-UP functional part of the base station using the identifier of the base station; and
    transmitting, in response to the request message, a response message to the CU-CP functional part of the base station, the response message including an identifier of the created UP functional part of the base station.

2. The method of claim 1, further comprising:
    obtaining the response message from the created CU-UP functional part of the base station.

3. The method of claim 1, further comprising:
    generating a notification message comprising an indication of the configured CU-UP functional part for the base station; and
    transmitting the notification message to a management node.

4. The method of claim 1, wherein the request message further comprises a Public Land Mobile Network (PLMN) list.

5. The method of claim 1, wherein the request message further comprises a list of valid network slices.

6. The method of claim 1, wherein the request message further comprises a length of the identifier of the base station.

7. The method of claim 1, wherein the request message is a gNB central unit control plane E1, GNB-CU-CP E1, SETUP REQUEST message.

8. The method of claim 1, wherein the response message is a gNB central unit control plane E1, GNB-CU-CP E1, SETUP RESPONSE message.

9. A method performed by a central unit, CU, -control plane (CP) functional part of a base station, the method comprising:
    establishing a transport network layer (TNL) association with a network function capable of supporting at least a CU-user plane (UP) functional part of the base station;
    transmitting to the network function a request message for establishing an E1 interface, the request message including an identifier of the base station, the identifier including a gNB identity of the base station; and
    receiving, in response to the request message, a response message from the network function, the response message comprising an identifier of a CU-UP functional part of the base station, the CU-UP functional part of the base station having been created by the network function using the identifier of the base station.

10. The method of claim 9, wherein the response message was generated by the CU-UP functional part of the base station created by the network function.

11. The method of claim 9, wherein the request message further comprises a Public Land Mobile Network, PLMN, list.

12. The method of claim 9, wherein the request message further comprises a list of valid network slices.

13. The method of claim 9, wherein the request message further comprises a length of the identifier of the base station.

14. The method of claim 9, wherein the request message is a gNB central unit control plane E1, GNB-CU-CP E1, SETUP REQUEST message.

15. The method of claim 9, wherein the response message is a gNB central unit control plane E1, GNB-CU-CP E1, SETUP RESPONSE message.

16. A non-transitory computer readable storage medium comprising a computer program comprising instructions which when executed by processing circuitry causes the processing circuitry to perform the method of claim 1.

17. A non-transitory computer readable storage medium comprising a computer program comprising instructions which when executed by processing circuitry causes the processing circuitry to perform the method of claim 9.

18. A network node comprising processing circuitry adapted to implement a network function capable of supporting at least a central unit, CU, -user plane (UP) functional part of the network node, the network function being configured to:
    establish a transport network layer (TNL) association with a CU-control plane (CP) functional part of the network node;
    receive a request message for establishing an E1 interface from the CU-CP functional part of the network node, the request message including an identifier of the network node, the identifier including a qNB identity of the network node;
    creating a CU-UP functional part of the network node using the identifier of the network node; and
    transmit, in response to the request message, a response message to the CU-CP functional part of the network node, the response message including an identifier of the created CU-UP functional part of the network node.

19. The network node of claim 18, wherein the network function is configured to:
    obtain the response message from the created CU-UP functional part of the network node.

20. The network node of claim 18, wherein the network function is configured to:
    generate a notification message comprising an indication of the configured CU-UP functional part for the network node; and
    transmit the notification message to a management node.

21. The network node of claim 18, wherein the request message further comprises one or more of: a Public Land Mobile Network (PLMN) list, a list of valid network slices, or a length of the identifier of the network node.

22. The network node of claim 18, wherein the request message is a gNB central unit control plane E1, GNB-CU-CP E1, SETUP REQUEST message.

23. The network node of claim 18, wherein the response message is a gNB central unit control plane E1, GNB-CU-CP E1, SETUP RESPONSE message.

24. A network node comprising processing circuitry adapted to implement a central unit, CU, -control plane (CP) functional part of the network node, wherein the CP functional part is configured to:
    establish a transport network layer (TNL) association with a network function capable of supporting at least a CU-user plane (UP) functional part of the network node;
    transmitting to the network function a request message for establishing an E1 interface, the request message including an identifier of the network node, the identifier including a gNB identity of the network node; and
    receiving a response message from the network function, the response message including an identifier of a CU-UP functional part of the network node, the CU-UP functional part of the network node having been created by the network function using the identifier of the network node.

25. The network node of claim 24, wherein the response message was generated by the CU-UP functional part of the network node created by the network function.

26. The network node of claim 24, wherein the request message further comprises one or more of: a Public Land Mobile Network (PLMN) list, a list of valid network slices, or a length of the identifier of the network node.

27. The network node of claim 24, wherein the request message is a gNB central unit control plane E1, GNB-CU-CP E1, SETUP REQUEST message.

28. The network node of claim 24, wherein the response message is a gNB central unit control plane E1, GNB-CU-CP E1, SETUP RESPONSE message.

* * * * *